United States Patent
Hawley (10) Patent No.: US 11,959,448 B2
(45) Date of Patent: Apr. 16, 2024

(54) TRAIL DRIVING ENGINE START-STOP JUDGMENT SYSTEMS AND METHODS

(71) Applicant: Toyota Motor Engineering & Manufacturing North America, Inc., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/592,636

(22) Filed: Feb. 4, 2022

(65) Prior Publication Data

US 2023/0250787 A1 Aug. 10, 2023

(51) Int. Cl.
*F02N 11/08* (2006.01)

(52) U.S. Cl.
CPC .. *F02N 11/0837* (2013.01); *F02N 2200/0801* (2013.01); *F02N 2200/124* (2013.01); *F02N 2300/20* (2013.01)

(58) Field of Classification Search
CPC .. F02N 11/08; F02N 11/0837; F02N 2200/08; F02N 2200/0801; F02N 2200/124; F02N 2200/20
See application file for complete search history.

(56) References Cited

U.S. PATENT DOCUMENTS

| | | | |
|---|---|---|---|
| 9,062,983 B2 | 6/2015 | Zych | |
| 9,958,473 B1* | 5/2018 | Sljivar | G01P 1/04 |
| 10,352,287 B2 | 7/2019 | Chen et al. | |
| 10,486,699 B2 | 11/2019 | Lu et al. | |
| 10,828,953 B2 | 11/2020 | Anderson et al. | |
| 2006/0017414 A1* | 1/2006 | Joe | B60W 20/00 318/432 |
| 2006/0020177 A1* | 1/2006 | Seo | A63B 24/0062 600/595 |
| 2011/0109170 A1* | 5/2011 | Chen | H02J 9/061 307/121 |
| 2012/0179357 A1 | 7/2012 | Phillips | |

(Continued)

*Primary Examiner* — John Kwon
*Assistant Examiner* — Johnny H Hoang
(74) *Attorney, Agent, or Firm* — HAYNES AND BOONE, LLP (57) ABSTRACT

Systems and methods for determining whether to use engine start-stop systems during trail or other off-road driving are provided. Systems and methods may utilize various vehicle sensors (e.g., lidar, forward-facing cameras, accelerometers, sonar sensors, etc.) to detect when it is appropriate to command engine stop for fuel economy while driving off-road. To determine appropriateness, the vehicle may evaluate obstacles, ground clearance, and/or vehicle inclination. A method may include measuring accelerations/inclinations of a vehicle, comparing an acceleration value of each acceleration to an acceleration threshold, and disabling a start-stop system of the vehicle based on at least one acceleration value exceeding the acceleration threshold. A system may include an accelerometer configured to measure accelerations of a vehicle, and a logic device configured to compare an acceleration value of each acceleration to an acceleration threshold, and disable a start-stop system based on at least one acceleration value exceeding the acceleration threshold.

19 Claims, 7 Drawing Sheets

(56) References Cited

U.S. PATENT DOCUMENTS

| | | | |
|---|---|---|---|
| 2013/0296136 A1* | 11/2013 | Doering | B60W 20/40 |
| | | | 477/174 |
| 2016/0185337 A1* | 6/2016 | Morita | B60W 50/06 |
| | | | 701/22 |
| 2017/0080923 A1* | 3/2017 | Johri | B60W 20/10 |
| 2017/0282921 A1 | 10/2017 | Limbacher | |
| 2018/0093669 A1* | 4/2018 | Khafagy | F16H 63/50 |
| 2019/0196510 A1* | 6/2019 | Zhu | G08G 5/0069 |
| 2019/0217847 A1* | 7/2019 | Hawley | B60W 30/18109 |
| 2019/0367044 A1* | 12/2019 | Nakagawara | B60W 30/18 |
| 2022/0176972 A1* | 6/2022 | Miller | G08G 1/0125 |

* cited by examiner

TRAIL DRIVING ENGINE START-STOP JUDGMENT SYSTEMS AND METHODS

TECHNICAL FIELD

The present disclosure relates generally to vehicle systems, and, more particularly, to systems and methods for determining whether to use engine start-stop systems during trail or other off-road driving.

BACKGROUND

During overlanding, it is often desirable to have good fuel consumption to reduce the amount of fuel that needs to brought into the field. To improve fuel economy, engine start-stop systems can be utilized to improve powertrain efficiency. Engine starts can cause shocks and engine delay that may not be desired during technical off-road driving, such as rock crawling, fording a river, traversing sand, etc.

Therefore, a need exists in the art for systems and methods that address the above deficiencies, or at least offers an improvement, in the art. For example, a need exists for systems and methods that determine whether to use engine start-stop systems during trail or other off-road driving.

BRIEF SUMMARY

Embodiments of the present disclosure are directed to systems and methods for determining whether to use engine start-stop systems during trail or other off-road driving. For example, systems and methods are provided that utilize various vehicle sensors or systems (e.g., lidar, forward-facing cameras, accelerometers, sonar sensors, etc.) to detect when it is appropriate to command engine stop for fuel economy while driving off-road. To determine appropriateness, the vehicle may evaluate obstacles, ground clearance, and/or vehicle inclination.

Various embodiments of the present disclosure include a method. The method includes measuring accelerations of a vehicle in three dimensions, comparing acceleration values of the accelerations to corresponding acceleration thresholds, and disabling a start-stop system of the vehicle based on one or more acceleration values exceeding the corresponding acceleration thresholds.

Various embodiments of the present disclosure include another method. The method includes measuring accelerations of a vehicle in three dimensions, comparing an acceleration value of each acceleration to an acceleration threshold, and disabling a start-stop system of the vehicle based on at least one acceleration value exceeding the acceleration threshold.

Various embodiments of the present disclosure include a system. The system includes an accelerometer configured to measure accelerations of a vehicle in three dimensions, and a logic device configured to perform operations, including comparing an acceleration value of each acceleration to an acceleration threshold, and disabling a start-stop system of the vehicle based on at least one acceleration value exceeding the acceleration threshold.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure are directed to engine start-stop systems and methods that may be utilized in off-road environments. In embodiments, engine start-stop systems utilize lidar sensors, forward, facing cameras, accelerometers, and/or sonar sensors to detect when it is appropriate to command engine stop for fuel economy while driving off-road. To determine appropriateness, the vehicle may evaluate obstacles, ground clearance, and/or vehicle inclination.

In embodiments, the vehicle may use various sensors to detect and evaluate trail obstacles to prevent an engine start-stop system from operating during challenging rock crawling or obstacle navigation. The vehicle may maintain a table of vehicle speeds and obstacle heights to determine whether the engine start-stop system should be activated while off-road.

In embodiments, the vehicle may use various sensors to determine the amount of vehicle ground clearance. If a low ground clearance condition is detected (e.g., as caused by a high surface height of surrounding water, sand, or mud, for instance), the system may inhibit engine stop to keep the engine running to provide immediate power to the vehicle to limit getting stuck.

In embodiments, the vehicle may use various sensors to determine an acceleration and/or rotational position. If any acceleration or position is outside of a nominal flat driving threshold, the system may inhibit engine stop to limit undesired shocks or engine delays caused by an engine start. The vehicle may maintain a table of vehicle positions and/or accelerations to determine whether the engine start-stop system should be activated while off-road.

Figure 1:
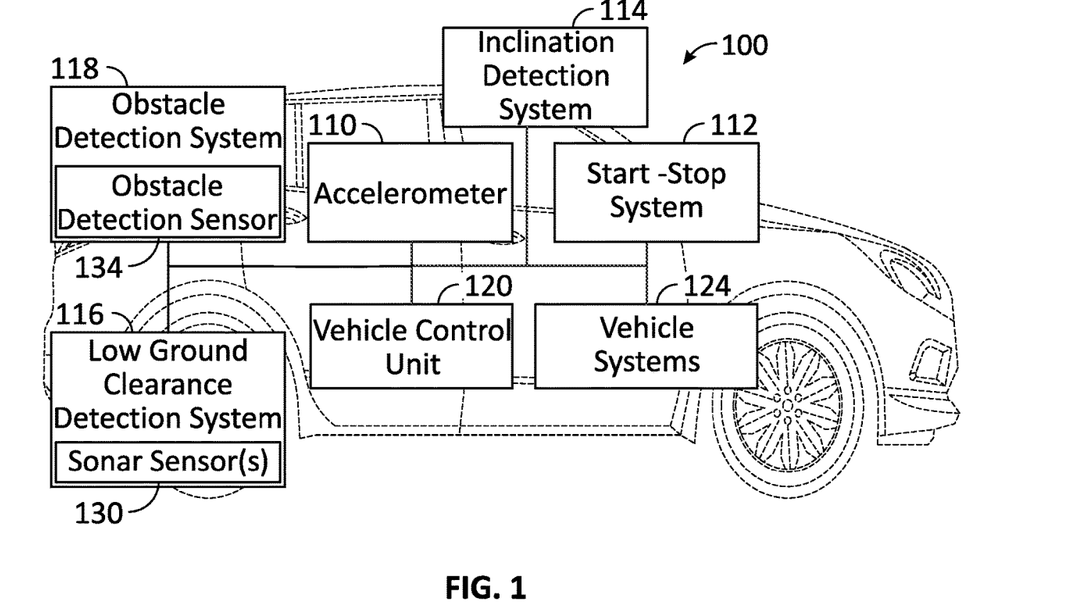
FIG. 1 is a diagram of various systems of a vehicle, according to one or more embodiments of the disclosure.

FIG. 1 is a diagram of various systems of a vehicle 100, according to one or more embodiments of the disclosure. Referring to FIG. 1, vehicle 100 may include one or more features or components configured to determine when to command engine stop for fuel economy while driving off-road, as detailed more fully below. For example, vehicle 100 may include an accelerometer 110, a start-stop system 112, an inclination detection system 114, a low ground clearance detection system 116, an obstacle detection system 118, a vehicle control unit 120, and other vehicle systems 124. Vehicle 100 is depicted as an SUV in the illustrative embodiment of FIG. 1. However, in other example embodiments, vehicle 100 may be a truck, a van, a multipurpose vehicle, a sedan, or any other type of vehicle.

Accelerometer 110 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of vehicle 100 (or components thereof) and providing such measurements as sensor signals and/or data that may be communicated to other devices of vehicle 100 (e.g., start-stop system 112, inclination detection system 114, low ground clearance detection system 116, obstacle detection system 118, vehicle control unit 120, etc.). Accelerometer 110 may be a multi-axis accelerometer configured to detect both the magnitude and the direction of acceleration in three dimensions. Accelerometer 110 may be used to sense orientation, coordinate acceleration, vibration, and shock of vehicle 100 and/or components thereof. Accelerometer 100 may be configured to detect a rotational position of vehicle 100 (e.g., via one or more inclinometers). Accelerometer 110 may be implemented in the various systems of vehicle 100, such as inclination detection system 114, vehicle control unit 120, etc., or each system of vehicle 100 may include a separate accelerometer.

Start-stop system 112 is configured to automatically shut down and restart an engine (e.g., an internal combustion engine) of vehicle 100. Start-stop system 112 may detect an operating mode or driving status of vehicle 100. For example, start-stop system 112 may detect a clutch position, a transmission configuration, a brake configuration, a speed, and/or other condition of vehicle 100 from various vehicle sensors. Based on the information obtained from vehicle sensors, start-stop system 112 may shut down and restart the vehicle's engine. For example, start-stop system 112 may shut down the engine when vehicle is stopped, such as when stopped and the clutch released in neutral or when braked to a standstill and the driver's foot remains on the brake pedal. When the brake is released or when the clutch is actuated, start-stop system 112 may start the engine again.

In this manner, start-stop system 112 can be utilized to improve powertrain efficiency (e.g., fuel economy), such as in hybrid vehicles or non-electric vehicles. Although advantageous at times (e.g., while driving on road during normal driving conditions), use of start-stop system 112 may cause powertrain shocks and delay that may not be desired during technical off-road driving, such as climbing over a rock, fording a river, driving in sand, driving at an incline, etc. As detailed below, activation of start-stop system 112 may be modified based on detected off-road conditions. For example, start-stop system 112 may be disabled during technical off-road driving, such as based on evaluated obstacles, ground clearance, and/or vehicle inclination.

Inclination detection system 114 is configured to detect vehicle inclination. For example, inclination detection system 114 may monitor one or more accelerations and/or inclinations measured by accelerometer 110. As a result, inclination detection system 114 may detect if vehicle 100 is operating in an inclined driving condition (e.g., driving uphill, driving downhill, driving on a sidehill (side hill driving or sidehilling)).

Low ground clearance detection system 116 is configured to detect vehicle ground clearance. For example, low ground clearance detection system 116 may include one or more sensors configured to measure a surface height of adjacent material (e.g., water, sand, etc.). As illustrated, low ground clearance detection system 116 includes one or more sonar sensors 130 configured to measure the surface height relative to vehicle 100.

Obstacle detection system 118 is configured to detect one or more obstacles in a path of vehicle 100. For example, obstacle detection system 118 may detect rocks, fallen trees, or other trail obstacles. In embodiments, obstacle detection system 118 includes an obstacle detection sensor 134 configured to detect and/or measure the height of a trail obstacle. Obstacle detection sensor 134 may include at least one of a lidar sensor or a camera (e.g., a forward-facing camera, a rear-facing camera, etc.), although other configurations are contemplated.

Vehicle control unit 120 may be any logic device, controller, processor, module, circuitry, or device configured to perform one or more operations. Vehicle control unit 120, which may be referred to as a logic device, may be implemented as any appropriate controller (e.g., processing device, microcontroller, electronic control unit, processor, application specific integrated circuit (ASIC), field programmable gate array (FPGA), memory storage device, memory reader, or other device or combinations of devices) that may be adapted to execute, store, and/or receive appropriate instructions, such as software instructions for controlling various operations of vehicle 100, such as accelerometer 110, start-stop system 112, inclination detection system 114, low ground clearance detection system 116, obstacle detection system 118, vehicle systems 124, and/or other elements of vehicle 100, for example. Such software instructions may also implement methods for processing images, video, and/or other sensor signals or data, determining sensor information, providing user feedback (e.g., through a user interface), querying devices for operational parameters, selecting operational parameters for devices, or performing any of the various operations described herein (e.g., operations performed by logic devices of various devices of vehicle 100).

Vehicle control unit 120 may be communicatively connected to accelerometer 110, start-stop system 112, inclination detection system 114, low ground clearance detection system 116, obstacle detection system 118, and vehicle systems 124. Vehicle control unit 120 may be configured to receive data from at least one sensor of vehicle 100. For example, vehicle control unit 120 may receive data or other sensor signals from accelerometer 110, a brake pedal sensor, a transmission sensor, a clutch pedal sensor, sonar sensor(s) 130, obstacle detection sensor 134, or any combination thereof. In embodiments, vehicle control unit 120 may receive data from a map, a service, or a network, among other external sources identifying one or more conditions, obstacles, or elements of an off-road trail. Depending on the application, vehicle control unit 120 may receive and transmit data over wired or wireless communication.

Based on data received, vehicle control unit 120 may be configured to determine a trail condition. For instance, vehicle control unit 120 may determine that one or more trail obstacles exist based on data received from obstacle detection sensor 134 monitoring the path of vehicle 100, that vehicle inclination is occurring based on data received from accelerometer 110, and/or that a low ground clearance condition exists based on data received from sonar sensor(s) 130. In embodiments, vehicle control unit 120 may apply one or more machine learning algorithms in determining the trail conditions. As a result, vehicle control unit 120 may include one or more smart features to adapt the system where appropriate.

With continued reference to FIG. 1, vehicle 100 may include other components or systems. For example, vehicle systems 124 may include a propulsion system (e.g., engine and drivetrain), a suspension system, a GPS system, a vehicle dynamics system, sensors, interfaces, controllers, control systems, an audio system, a display system, a communications system, and/or a user interface system, among others, of vehicle 100.

Figure 2:
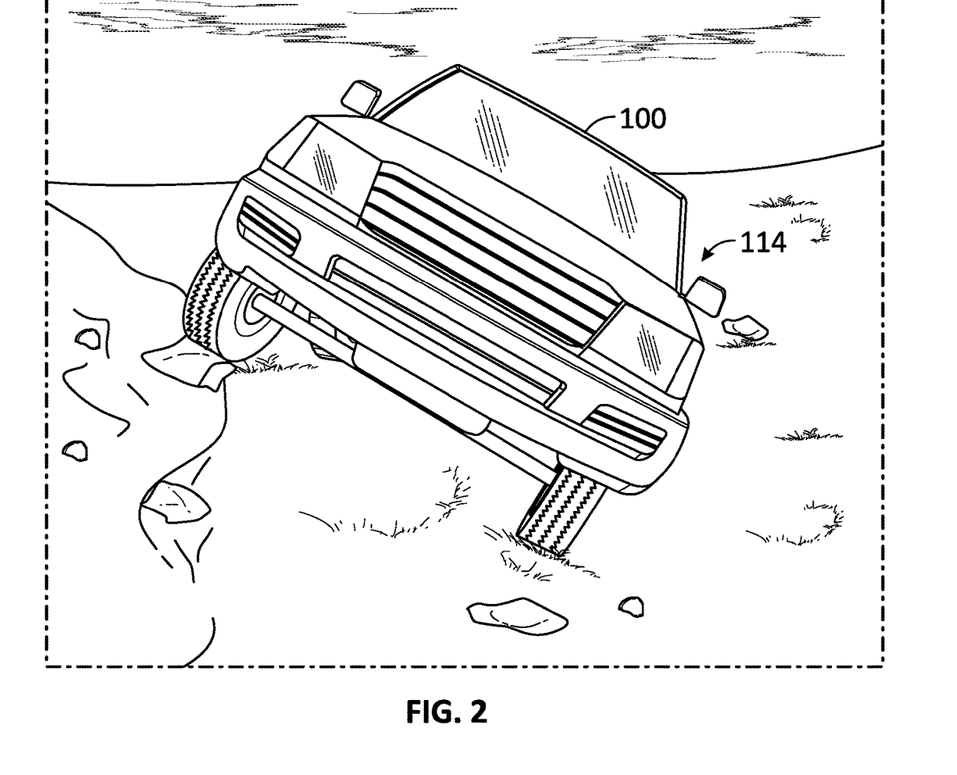
FIG. 2 illustrates use of an inclination detection system of a vehicle, according to one or more embodiments of the disclosure.

FIG. 2 illustrates use of inclination detection system 114, according to one or more embodiments of the disclosure. As illustrated, vehicle 100 may be used to traverse one or more obstacles causing moderate to severe vehicle inclination (e.g., side hill driving as shown). As noted above, inclination detection system 114 may detect x, y, z acceleration of vehicle 100 (e.g., as measured by accelerometer 110). If any of the measured accelerations are outside of a nominal flat driving range, inclination detection system 114 may determine that vehicle 100 is likely in a challenging driving situation that would benefit from disabling start-stop system 112. For example, vehicle inclination above a threshold, such as that shown in FIG. 2, may warrant disabling start-stop system 112 to avoid sudden shocks or delays caused by engine start. In this manner, start-stop system 112 may be disabled to improve off-road performance of vehicle 100 based on detected vehicle inclination.

Figure 3:
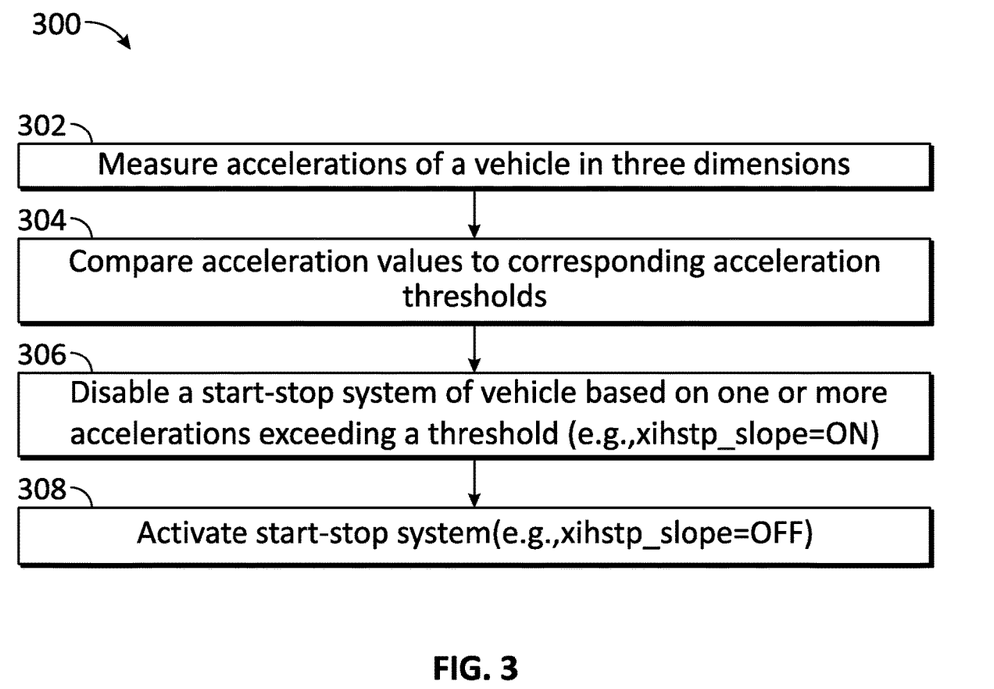
FIG. 3 is a flowchart of a method of disabling a start-stop system of a vehicle based on a detected inclination angle, according to one or more embodiments of the disclosure.

FIG. 3 is a flowchart of a method 300 of disabling start-stop system 112 of vehicle 100 based on a detected inclination angle, according to one or more embodiments of the disclosure. For explanatory purposes, method 300 is described with reference to FIGS. 1-2. Note that one or more operations in FIG. 3 may be combined, omitted, and/or performed in a different order as desired. According to various embodiments, method 300 may be performed by a logic device, such as vehicle control unit 120 of vehicle 100, or a combination of the aforementioned logic devices, which may be communicatively coupled to execute the operations of method 300.

In block 302, method 300 includes measuring accelerations of vehicle 100 in three dimensions. For example, accelerations of vehicle 100 may be measured using accelerometer 110. In embodiments, block 302 may include monitoring x, y, z accelerometer signals, such as monitoring accelerometer 110.

In block 304, method 300 includes comparing acceleration values to corresponding acceleration thresholds. In embodiments, block 304 includes comparing an acceleration value of each measured acceleration to an acceleration threshold. For example, acceleration values may be compared against acceleration threshold(s) independently.

In block 306, method 300 includes disabling start-stop system 112 of vehicle 100 (e.g., xihstp_slope=ON) based on one or more acceleration values exceeding corresponding acceleration thresholds. In embodiments, block 306 includes disabling start-stop system 112 based on at least one acceleration value exceeding an acceleration threshold. In embodiments, block 306 may include referencing a look-up table, such as a 1-dimensional map, to determine whether to disable start-stop system 112 at a given acceleration value. As a result, engine stop may be inhibited if acceleration/slope values are above predetermined thresholds, for at least the reasons noted above.

In block 308, method 300 includes activating start-stop system 112 (e.g., xihstp_slope=OFF). For example, once active, xihstp_slope may be kept ON until the measured acceleration/slope is below the acceleration threshold(s), such as below the look-up table. In embodiments, start-stop system 112 may be activated based on all acceleration values being less than the corresponding acceleration thresholds. Start-stop system 112 may be activated based on each acceleration value being less than an acceleration threshold. In embodiments, hysteresis may be provided in block 308 to ensure start-stop system 112 is not activated prematurely (e.g., vehicle 100 is out of the scene).

Figure 4:
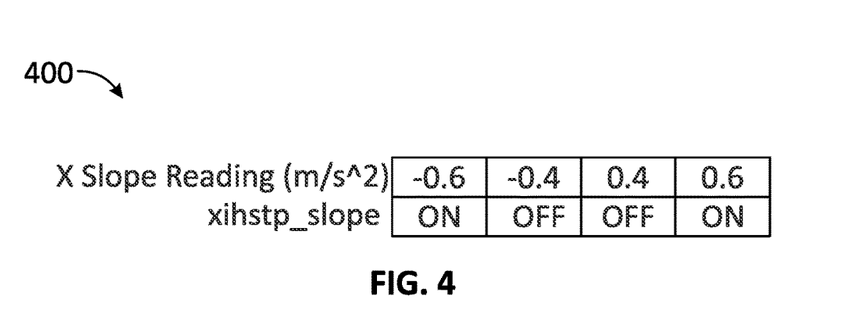
FIG. 4 is an illustration of an acceleration threshold map of the inclination detection system, according to one or more embodiments of the disclosure.

FIG. 4 is an illustration of an acceleration threshold map 400 of inclination detection system 114, according to one or more embodiments of the disclosure. As shown, acceleration threshold map 400 may be a 1-dimensional map mapping acceleration values (e.g., X Slope Reading) to start-stop system deactivation/disabling (e.g., xihstp_slope=ON) or start-stop system activation (e.g., xihstp_slope=OFF). For example, as illustrated in FIG. 4, acceleration values of −0.6 m/s$^2$ or 0.6 m/s$^2$ may indicate start-stop system deactivation/disabling, and acceleration values of −0.4 m/s$^2$ or 0.4 m/s$^2$ may indicate start-stop system activation, although other configurations are contemplated.

Figure 5A:
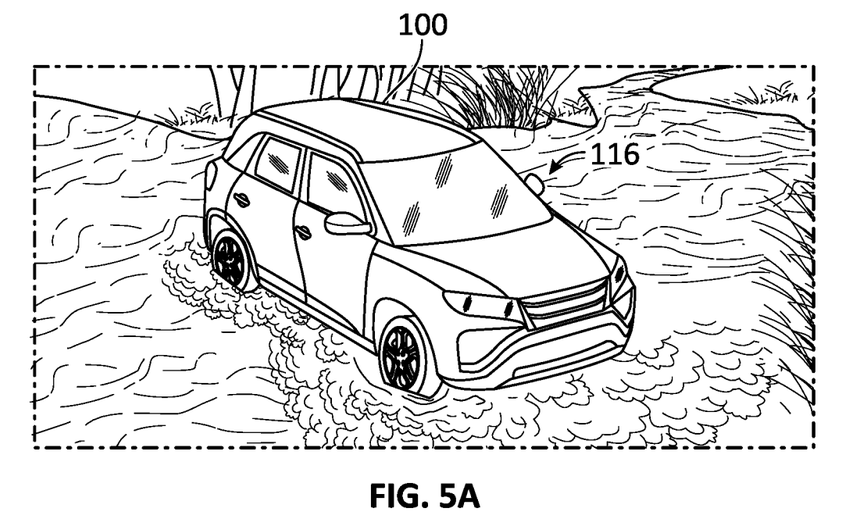
FIGS. 5A-5B illustrates use of a low ground clearance detection system of a vehicle, according to one or more embodiments of the disclosure.
Figure 5B:
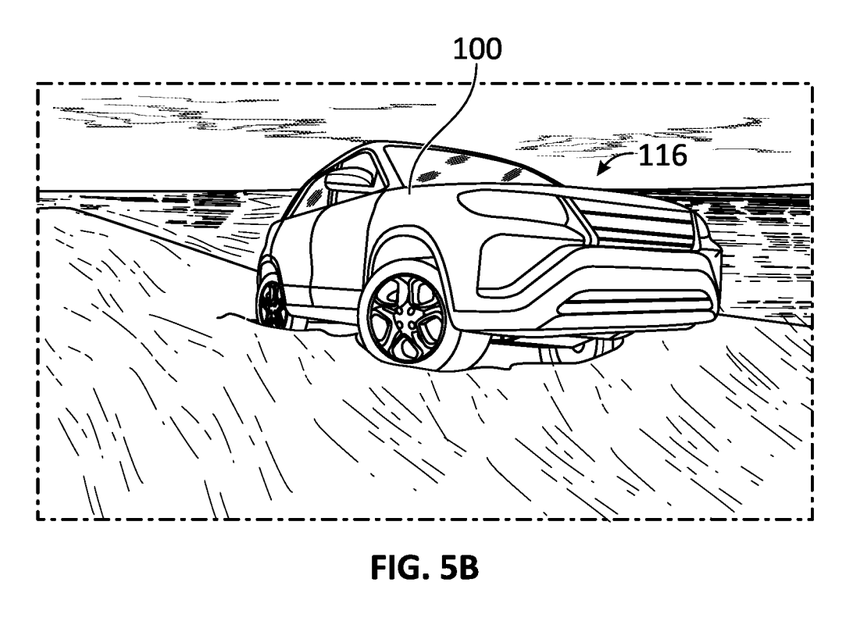

FIGS. 5A-5B illustrate use of low ground clearance detection system 116, according to one or more embodiments of the disclosure. As illustrated, vehicle 100 may be used to traverse one or more obstacles resulting in a low ground clearance condition of vehicle 100. For example, vehicle 100 may be used to cross a river (see FIG. 5A) or traverse sand, mud, or similar environments (see FIG. 5B). During river fording, the tailpipe can become submerged, and in such situations the engine needs to be kept running to limit excess water from entering the exhaust system. During sand or mud driving, for example, it is desirable to keep the engine running to provide immediate power to vehicle 100 to limit getting stuck. For example, when driving in sand, mud, or other conditions, if momentum is stopped it may be very easy to get stuck. In these and other conditions, low ground clearance detection system 116 may disable start-stop system 112 of vehicle 100, so that the engine is not shut down when traversing such obstacles.

The surface height of the water, sand, or mud, for instance, may determine whether start-stop system 112 is disabled. For instance, when traversing deep water, mud, or sand, among others, of a certain depth or greater relative to vehicle 100 (e.g., a surface height threshold), deactivation of start-stop system 112 may be desirable, for at least the reasons noted above. Alternatively, the water, mud, or sand, among others, may be shallow enough not requiring deactivation of start-stop system 112. The surface height threshold may be predetermined or updated based on characteristics of vehicle 100 (e.g., added lift kit, bigger tires, etc.).

Figure 6:
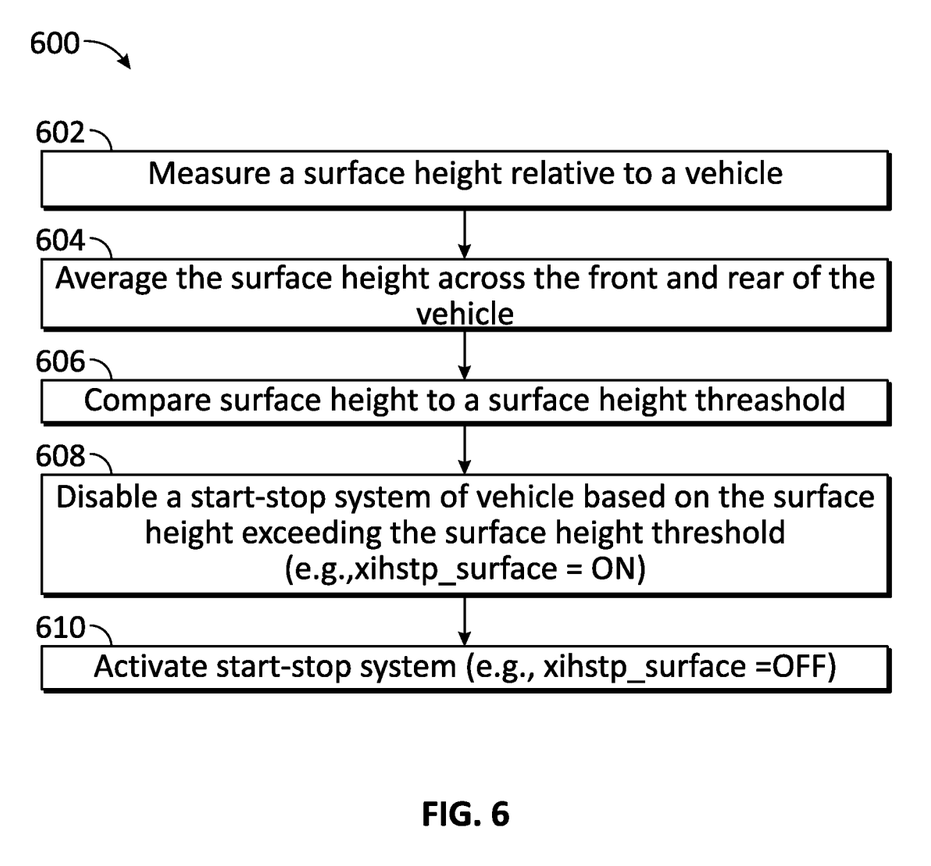
FIG. 6 is a flowchart of a method of disabling a start-stop system of a vehicle based on a detected low ground clearance, according to one or more embodiments of the disclosure.

FIG. 6 is a flowchart of a method 600 of disabling start-stop system 112 of vehicle 100 based on a detected low ground clearance, according to one or more embodiments of the disclosure. For explanatory purposes, method 600 is described with reference to FIGS. 1-5. Note that one or more operations in FIG. 6 may be combined, omitted, and/or performed in a different order as desired. According to various embodiments, method 600 may be performed by a logic device, such as vehicle control unit 120 of vehicle 100, or a combination of the aforementioned logic devices, which may be communicatively coupled to execute the operations of method 600.

In block 602, method 600 includes measuring a surface height relative to vehicle 100. The surface height may be the height of one or more surfaces surrounding vehicle 100, such as the height/level of water, sand, or mud through which vehicle 100 is traversing. Block 602 may include using sonar sensor 130 to measure the surface height relative to vehicle 100 (e.g., sand, water, or mud may be closer to vehicle 100). In embodiments, block 602 may include measuring the surface height in front of and behind vehicle 100. In such embodiments, method 600 includes averaging the surface height across a front and rear of vehicle 100 (block 604).

In block 606, method 600 includes comparing the measured surface height to a surface height threshold. For example, the measured surface height may be compared against a predetermined constant (e.g., 0.25 m). The surface height threshold may be provided in a look-up table, for instance.

In block 608, method 600 includes disabling start-stop system 112 (e.g., xihstp_surface=ON) based on the surface height exceeding the surface height threshold. As a result, engine stop may be inhibited if the surface height is above the surface height threshold, for at least the reasons noted above.

In block 610, method 300 includes activating start-stop system 112 (e.g., xihstp_surface=OFF). For example, once active, xihstp_surface may be kept ON until the measured surface height is below the surface height threshold or below a smaller threshold or constant (e.g., 0.15 m). In embodiments, hysteresis may be provided in block 610 to ensure start-stop system 112 is not activated prematurely (e.g., vehicle 100 is out of the scene).

Figure 7:
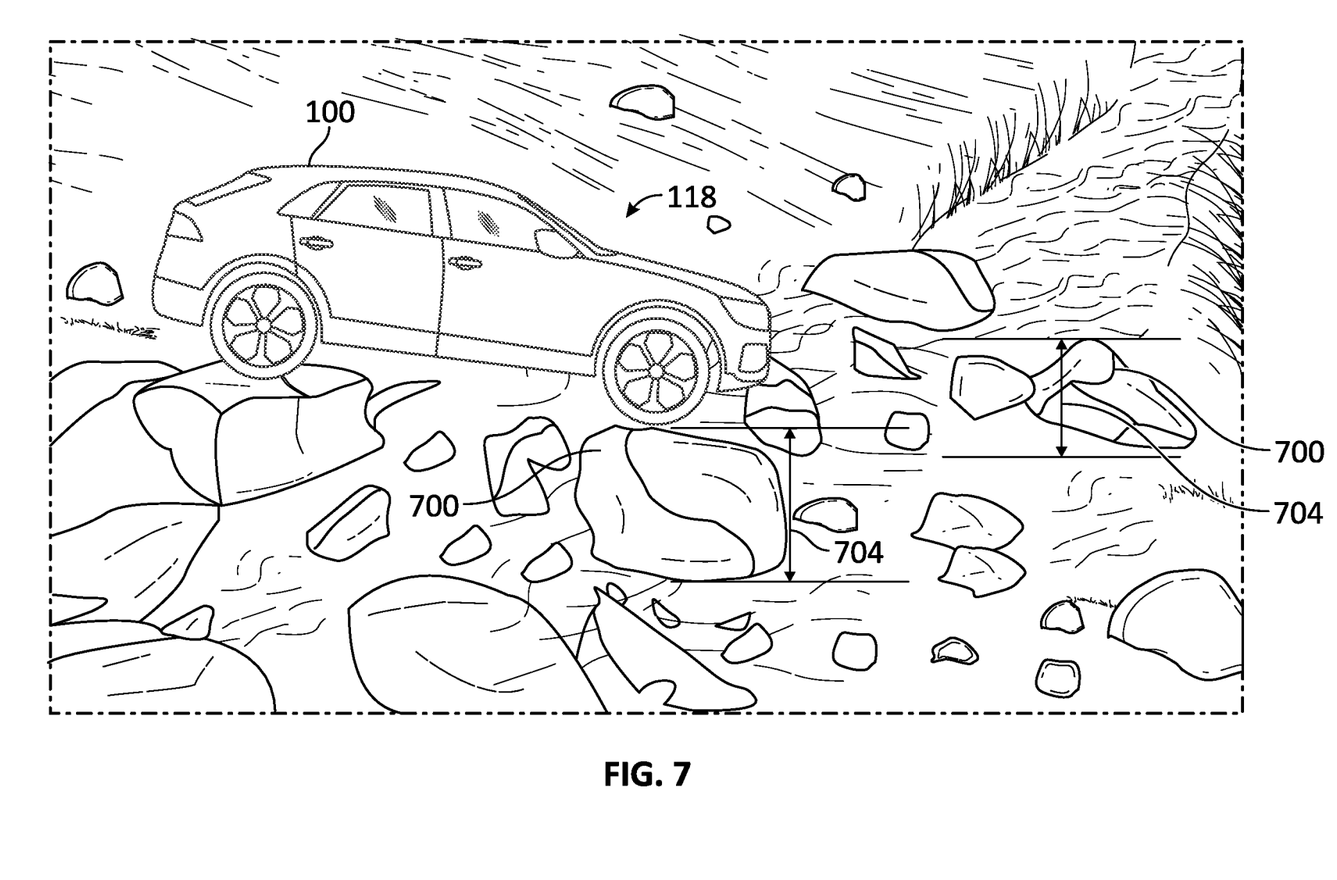
FIG. 7 illustrates use of an obstacle detection system of a vehicle, according to one or more embodiments of the disclosure.

FIG. 7 illustrates use of obstacle detection system 118, according to one or more embodiments of the disclosure. As illustrated, vehicle 100 may be used to traverse one or more trail obstacles 700, such as rocks, trees, steps, drop offs, or the like. In the illustrated scene, engine power/torque and shocks need to be predictable and controllable. If an engine start occurs while vehicle 100 is on a rock, for instance, the engine start can cause an acceleration bump or hesitation that may make it difficult to control vehicle 100. During such challenging rock crawling or another obstacle navigation scenario, obstacle detection system 118 may disable start-stop system 112 of vehicle 100, so that the vehicle's engine is not shut down when traversing such obstacles 700.

As illustrated in FIG. 7, each obstacle 700 may have a height 704. The height 704 of the obstacle 700 may determine whether start-stop system 112 is disabled. For instance, obstacles 700 of a certain height or greater (e.g., an obstacle height threshold) may necessitate deactivation of start-stop system 112, for at least the reasons noted above. Alternatively, obstacles 700 having a height less than the obstacle height threshold may be small enough not requiring deactivation of start-stop system 112. The obstacle height threshold may be predetermined or updated based on characteristics of vehicle 100 (e.g., added lift kit, bigger tires, etc.).

Figure 8:
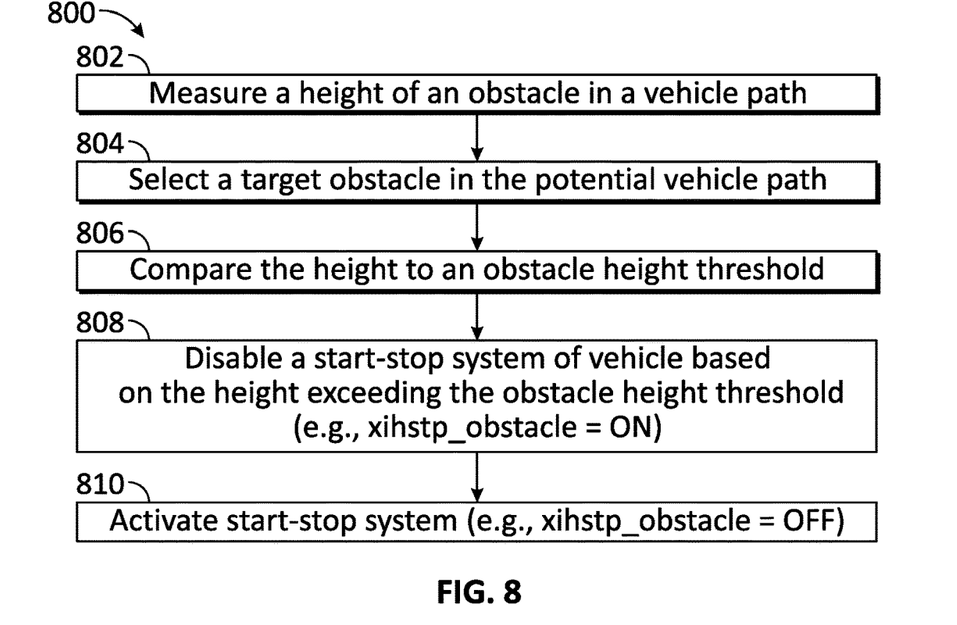
FIG. 8 is a flowchart of a method of disabling a start-stop system of a vehicle based on a detected obstacle height, according to one or more embodiments of the disclosure.

FIG. 8 is a flowchart of a method 800 of disabling start-stop system 112 of vehicle 100 based on a detected obstacle height 704, according to one or more embodiments of the disclosure. For explanatory purposes, method 800 is described with reference to FIGS. 1-7. Note that one or more operations in FIG. 8 may be combined, omitted, and/or performed in a different order as desired. According to various embodiments, method 800 may be performed by a logic device, such as vehicle control unit 120 of vehicle 100, or a combination of the aforementioned logic devices, which may be communicatively coupled to execute the operations of method 800.

In block 802, method 800 includes measuring height 704 of one or more obstacles 700 in a path of vehicle 100. For instance, obstacle detection sensor 134 may measure height 704 of each obstacle 700 or one or more (e.g., selected) obstacles 700 along the potential vehicle path.

In block 804, method 800 includes selecting a target obstacle in the vehicle path. The target obstacle may be selected for comparing against an obstacle height threshold. For example, the target obstacle may be the highest obstacle in the vehicle path. The target obstacle may be selected based on having the greatest height 704.

In block 806, method 800 includes comparing height 704 to the obstacle height threshold. In embodiments, block 806 may include referencing a look-up table, such as a 1-dimensional map, to determine whether to disable start-stop system 112 at a measured obstacle height 704. As a result, engine stop may be inhibited if measured obstacles heights 704 are above predetermined thresholds, for at least the reasons noted above.

In block 808, method 800 includes disabling start-stop system 112 (e.g., xihstp_obstacle=ON) based on height 704 exceeding the obstacle height threshold. As a result, engine stop may be inhibited if height 704 is above the obstacle height threshold, for at least the reasons noted above.

In block 810, method 800 includes activating start-stop system 112 (e.g., xihstp_obstacle=OFF). For example, once active, xihstp_obstacle may be kept ON until the measured height 704 is below the obstacle height threshold. In embodiments, hysteresis may be provided in block 810 to ensure start-stop system 112 is not activated prematurely (e.g., vehicle 100 is out of the scene).

Figure 9:
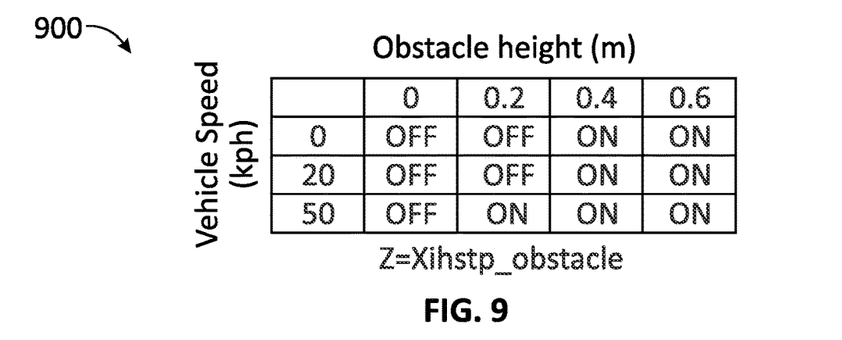
FIG. 9 is an illustration of an obstacle height threshold map of the obstacle detection system, according to one or more embodiments of the disclosure.

FIG. 9 is an illustration of an obstacle height threshold map 900 of obstacle detection system 118, according to one or more embodiments of the disclosure. Obstacle height threshold map 900 may be a 2-dimensional map mapping obstacle height and vehicle speed to start-stop system deactivation/disabling (e.g., xihstp_obstacle=ON) or start-stop system activation (e.g., xihstp_obstacle=OFF). As shown, the obstacle height threshold may vary based on vehicle speed. For example, higher vehicle speeds may correspond with a lower obstacle height threshold, and vice-versa. As illustrated in FIG. 9, deactivation of start-stop system 112 may occur at obstacle heights of 0.4 m and 0.6 m at vehicle speeds of 0 kph and 20 kph, and at obstacle heights of 0.2 m, 0.4 m, and 0.6 m at vehicle speeds of 50 kph, although other configurations are contemplated.

Figure 10:
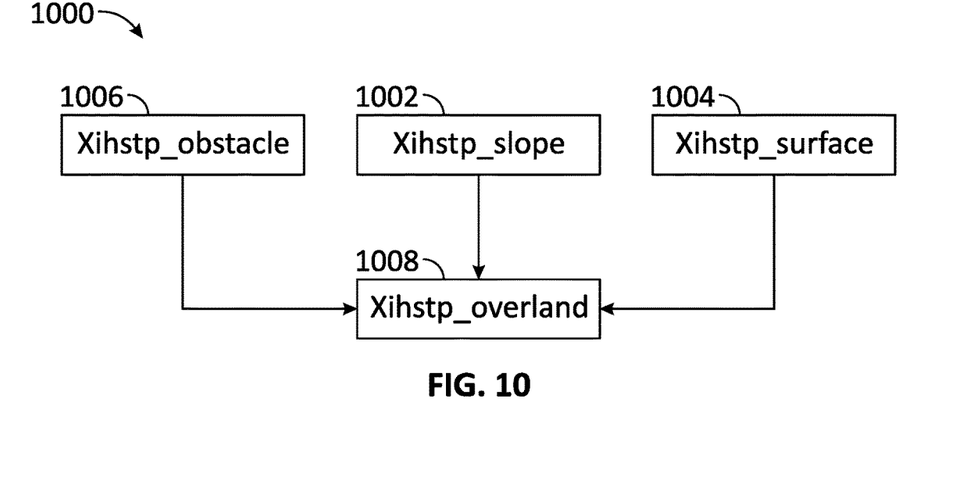
FIG. 10 is a flowchart of a method of controlling a start-stop system of a vehicle based on data received from an inclination detection system, a low ground clearance detection system, and an obstacle detection system, according to one or more embodiments of the disclosure.

FIG. 10 is a flowchart of a method 1000 of controlling start-stop system 112 based on data received from inclination detection system 114, low ground clearance detection system 116, and obstacle detection system 118, according to one or more embodiments of the disclosure. For explanatory purposes, method 1000 is described with reference to FIGS. 1-9. Note that one or more operations in FIG. 10 may be combined, omitted, and/or performed in a different order as desired. According to various embodiments, method 1000 may be performed by a logic device, such as vehicle control unit 120 of vehicle 100, or a combination of the aforementioned logic devices, which may be communicatively coupled to execute the operations of method 1000.

In block 1002, method 1000 includes controlling activation of start-stop system 112 using inclination detection system 114. For example, block 1002 may include method 300, or any steps thereof. Block 1002 may determine status of xihstp_slope, such as ON or OFF, based on information received from inclination detection system 114.

In block 1004, method 1000 includes controlling activation of start-stop system 112 using low ground clearance detection system 116. For example, block 1004 may include method 600, or any steps thereof. Block 1004 may determine status of xihstp_surface, such as ON or OFF, based on information received from low ground clearance detection system 116.

In block 1006, method 1000 includes controlling activation of start-stop system 112 using obstacle detection system 118. For example, block 1006 may include method 800, or any steps thereof. Block 1006 may determine status of xihstp_obstacle, such as ON or OFF, based on information received from obstacle detection system 118.

In block 1008, method 1000 includes checking status of blocks 1002, 1004, and 1006. For instance, block 1008 may verify status of xihstp_slope as determined in block 1002, status of xihstp_surface as determined in block 1004, and status of xihstp_obstacle as determined in block 1006. If any is set to inhibit engine stop, then block 1008 will inhibit engine stop (e.g., xihstp_overland=ON). Each of block 1002, block 1004, and block 1006 needs to be set to allow engine stop in order for start-stop system 112 to be activated/enabled (e.g., xihstp_overland=OFF). For example, xihstp_slope, xihstp_obstacle, and xihstp_surface all have to be OFF in order to activate start-stop system 112 and allow engine stop.

Figure 11:
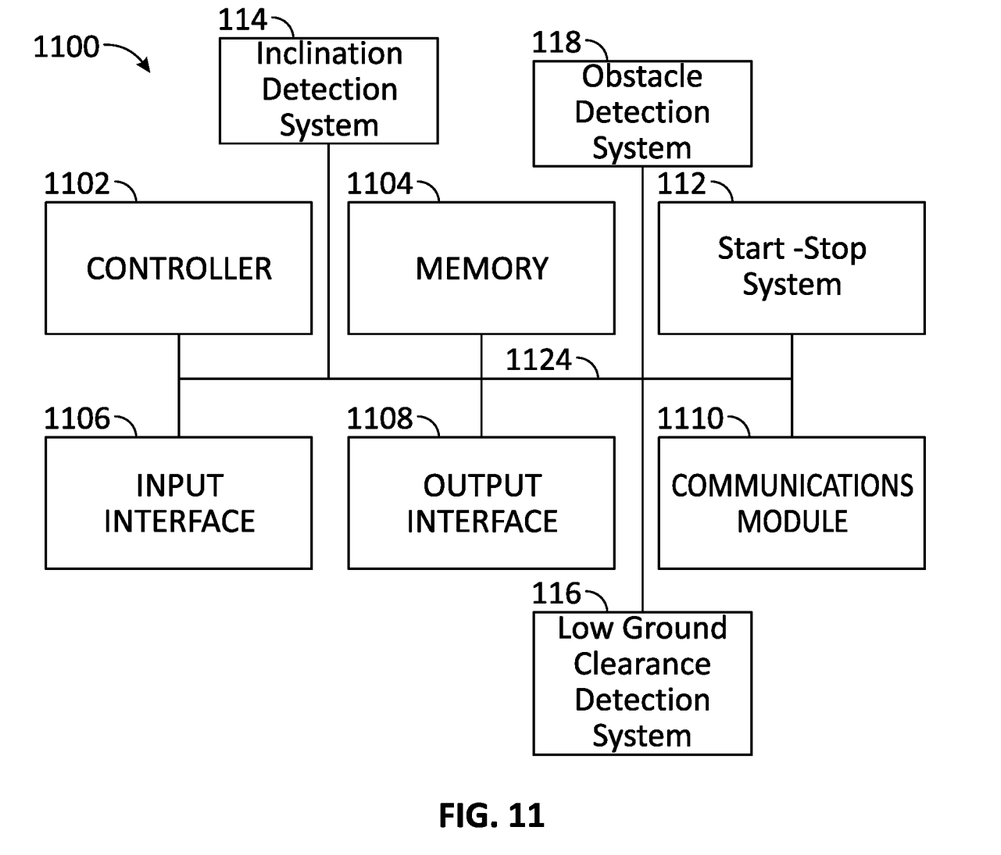
FIG. 11 is a diagram illustrating an example computing or processing system, according to one or more embodiments of the disclosure.

FIG. 11 is a diagram illustrating an example computing or processing system 1100 in which embodiments of the present disclosure may be implemented, according to one or more embodiments of the disclosure. For example, start-stop system 112, inclination detection system 114, low ground clearance detection system 116, and/or obstacle detection system 118, described above, may be implemented using system 1100. In some embodiments, method 300 of FIG. 3, method 600 of FIG. 6, and/or method 800 of FIG. 8, described above, may be implemented using system 1100. System 1100 can be or include a computer, phone, PDA, tablet, server, controller, or any other type of electronic device. Such an electronic device includes various types of computer readable media and interfaces for various other types of computer readable media. As shown in FIG. 11, system 1100 includes a controller 1102, a memory 1104, an input interface 1106, an output interface 1108, a communications module 1110, start-stop system 112, inclination detection system 114, low ground clearance detection system 116, and obstacle detection system 118.

Controller 1102, according to various embodiments, includes one or more of a processor, a microprocessor, a central processing unit (CPU), an electronic control unit, a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. Controller 1102 may be configured to interface and communicate with the various other components of system 1100 to perform such operations. For example, controller 1102 may be configured to receive and process map, position, distraction, facial monitoring, and vehicle dynamics data, among others, received from a network and/or one or more sensors (e.g., accelerometer 110, sonar sensor(s) 130, obstacle detection sensor 134, etc.), store the data in memory 1104, and/or retrieve stored data from memory 1104.

Controller 1102 may include combinations of hardware and software processing functionality and may be provided with/in and/or communicatively attached to other components to execute appropriate instructions, such as software instructions and/or processing parameters stored in memory 1104. In various embodiments, controller 1102 may be configured to execute software instructions stored in memory 1104 to perform various methods, processes, or operations in the manner described herein.

Memory 1104 includes, in one embodiment, one or more memory devices configured to store data and information, including magnetic flux data and position information. The memory 1104 may include one or more various types of memory devices including volatile and non-volatile memory devices, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, controller 1102 may be configured to execute software instructions stored in memory 1104 to perform method 300, method 600, and/or method 800 and process steps and/or operations. Controller 1102 may be configured to store data in memory 1104.

Input interface 1106 includes, in one embodiment, a user input and/or an interface device, such as one or more controls, knobs, buttons, slide bars, keyboards, sensors, cameras, and/or other devices, that are adapted to generate an input control signal. Controller 1102 may be configured to sense the input control signals from input interface 1106 and respond to any sensed input control signals received therefrom. Controller 1102 may be configured to interpret such an input control signal as a value, as generally understood by one skilled in the art. In one embodiment, input interface 1106 may include a control unit (e.g., a wired or wireless handheld control unit) having push buttons adapted to interface with a user and receive user input control values. In one implementation, the push buttons of the control unit may be used to control various system functions.

Output interface 1108 may enable, for example, the output of data or other information. Output interface 1108 may include, for example, one or more display devices, such as monitors or other visual displays (e.g., light emitting diode (LED) displays, liquid crystal displays (LCDs), head-up displays (HUDs), or other types of displays). Some implementations include devices such as a touchscreen that function as both input and output components. Controller 1102 may be configured to render data and information on output interface 1108. For example, controller 1102 may be configured to render data on output interface 1108, such as data stored in memory 1104.

In some embodiments, various components of system 1100 may be distributed and in communication with one another over a network. In this regard, communications module 1110 may be configured to facilitate wired and/or wireless communication among various system components over the network. Such a network may include, for example, a local area network ("LAN"), such as an Intranet, or a wide area network ("WAN"), such as the Internet.

In embodiments, various components of system 1100 may be communicatively connected via a system communications bus 1124. Bus 1124 collectively represents all system, peripheral, and chipset buses that communicatively connect the numerous devices of system 1100. For instance, bus 1124 may communicatively connect controller 1102, memory 1104, input interface 1106, output interface 1108, communications module 1110, start-stop system 112, inclination detection system 114, low ground clearance detection system 116, and obstacle detection system 118, or any combination thereof, together.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A method comprising:
   with an accelerometer disposed on a vehicle, measuring acceleration values of the vehicle in one, two, or three dimensions while the vehicle is traveling over off-road terrain;
   comparing the acceleration values measured by the accelerometer disposed on the vehicle to corresponding acceleration thresholds, wherein the comparing comprises determining that a first acceleration value of the measured acceleration values exceeds a first acceleration threshold; and
   disabling a start-stop system of the vehicle based on the first acceleration value exceeding the first acceleration threshold, such that the start-stop system is inhibited from stopping the engine when the first acceleration value exceeds the first acceleration threshold,
   wherein the first acceleration value exceeds the first acceleration threshold because the vehicle is traveling over the off-road terrain.

2. The method of claim 1, further comprising:
   referencing a lookup table comprising a one-dimensional map mapping acceleration values to either start-stop system deactivation or start-stop activation; and
   activating the start-stop system based on the acceleration values of the vehicle indicating start-stop activation in the lookup table.

3. The method of claim 1, further comprising:
   measuring a height of an obstacle in a path of the vehicle;
   comparing the height to an obstacle height threshold; and
   disabling the start-stop system based on the height exceeding the obstacle height threshold.

4. The method of claim 3, further comprising selecting a target obstacle in the path for comparing against the obstacle height threshold, wherein the target obstacle is selected based on having the greatest height.

5. The method of claim 3, further comprising:
   referencing a lookup table comprising a two-dimensional map mapping obstacle height and vehicle speed to either start-stop system deactivation or start-stop activation; and
   deactivating the start-stop system based on the measured height of the obstacle and the vehicle speed indicating start-stop deactivation in the lookup table,
   wherein the obstacle height threshold varies based on vehicle speed.

6. The method of claim 3, further comprising activating the start-stop system based on:
   all acceleration values being less than the corresponding acceleration thresholds; and
   the height being less than the obstacle height threshold.

7. The method of claim 1, further comprising:
   measuring a surface height relative to the vehicle;
   comparing the surface height to a surface height threshold; and
   disabling the start-stop system based on the surface height exceeding the surface height threshold.

8. The method of claim 7, further comprising averaging the surface height across a front and rear of the vehicle for comparing against the surface height threshold.

9. The method of claim 7, further comprising activating the start-stop system based on:
   all acceleration values being less than the corresponding acceleration thresholds; and the surface height being less than the surface height threshold.

10. A method comprising:
with an accelerometer disposed on a vehicle, measuring acceleration values of the vehicle in three dimensions while the vehicle is traveling over off-road terrain;
determining that a first acceleration value of the acceleration values measured by the accelerometer disposed on the vehicle exceeds a first acceleration threshold; and
disabling a start-stop system of the vehicle based on the first acceleration value exceeding the first acceleration threshold, such that the start-stop system is inhibited from stopping the engine when the first acceleration value exceeds the first acceleration threshold,
wherein the first acceleration value exceeds the first acceleration threshold because the vehicle is traveling over the off-road terrain.

11. The method of claim 10, further comprising:
measuring a height of an obstacle in a path of the vehicle;
comparing the height to an obstacle height threshold; and
disabling the start-stop system based on the height exceeding the obstacle height threshold.

12. The method of claim 11, further comprising:
measuring a surface height relative to the vehicle;
comparing the surface height to a surface height threshold; and
disabling the start-stop system based on the surface height exceeding the surface height threshold.

13. The method of claim 12, further comprising activating the start-stop system based on:
each measured acceleration value being less than the acceleration threshold;
the height being less than the obstacle height threshold; and
the surface height being less than the surface height threshold.

14. The method of claim 13, further comprising:
selecting a target obstacle in the path for comparing against the obstacle height threshold, wherein the target obstacle is selected based on having the greatest height; and
averaging the surface height across a front and rear of the vehicle for comparing against the surface height threshold.

15. A system configured to perform the method of claim 13, the system comprising:
the accelerometer, wherein the accelerometer is configured to measure the accelerations of the vehicle in three dimensions;
an obstacle detection sensor configured to measure the height of the obstacle;
a sonar sensor configured to measure the surface height relative to the vehicle; and
a logic device configured to perform operations comprising the method of claim 13.

16. A system comprising:
an accelerometer disposed on a vehicle and configured to measure acceleration values of the vehicle in one, two, or three dimensions while the vehicle is traveling over off-road terrain; and
a logic device configured to perform operations comprising:
determine that a first acceleration value of the acceleration values measured by the accelerometer disposed on the vehicle exceeds a first acceleration threshold, and
disable a start-stop system of the vehicle based on the first acceleration value exceeding the first acceleration threshold, such that the start-stop system is inhibited from stopping the engine when the first acceleration value exceeds the first acceleration threshold,
wherein the first acceleration value exceeds the first acceleration threshold because the vehicle is traveling over the off-road terrain.

17. The system of claim 16, further comprising:
an obstacle detection sensor configured to measure a height of an obstacle in a path of the vehicle; and
wherein the logic device is configured to perform further operations comprising:
compare the height to an obstacle height threshold, and
disable the start-stop system based on the height exceeding the obstacle height threshold.

18. The system of claim 17, further comprising:
a sonar sensor configured to measure the surface height relative to the vehicle; and
wherein the logic device is configured to perform further operations comprising:
compare the surface height to a surface height threshold, and
disable the start-stop system based on the surface height exceeding the surface height threshold.

19. The system of claim 18, wherein the logic device is configured to activate the start-stop system based on:
each acceleration value being less than the acceleration threshold;
the height being less than the obstacle height threshold; and
the surface height being less than the surface height threshold.

* * * * *